United States Patent [19]

Bickley et al.

[11] Patent Number: 4,971,638

[45] Date of Patent: Nov. 20, 1990

[54] METHOD OF MANUFACTURING A SENSING ELEMENT

[75] Inventors: Alan C. Bickley, Sawtry Huntingdon, England; Travis Moore, Dumfries, Scotland

[73] Assignee: The Gates Rubber Company, Denver, Colo.

[21] Appl. No.: 405,367

[22] Filed: Sep. 11, 1989

[30] Foreign Application Priority Data

Sep. 14, 1988 [GB] United Kingdom ............... 8821540

[51] Int. Cl.$^5$ .................. H01B 13/08; H01B 13/14; H01B 13/30
[52] U.S. Cl. .................................... 156/48; 156/51; 156/52; 156/53; 156/56; 156/83; 156/145; 156/146; 156/244.12; 174/25 R; 340/666; 428/308.4; 428/321.1; 428/380; 428/391; 428/396
[58] Field of Search .............. 156/48, 51, 52, 53, 156/56, 83, 145, 146, 244.12; 174/25 R; 340/666; 428/308.4, 321.1, 380, 391, 396

[56] References Cited

U.S. PATENT DOCUMENTS

| | | | |
|---|---|---|---|
| 2,314,694 | 3/1943 | Dodds | 174/25 R |
| 3,077,510 | 2/1963 | Olds | 174/25 R |
| 3,657,468 | 4/1972 | Tsukioka et al. | 174/25 R |
| 3,844,860 | 10/1974 | Edwards | 156/53 |
| 3,928,705 | 12/1975 | Loft et al. | 174/25 R X |
| 4,602,121 | 7/1986 | Priaroggia | 174/25 R |

FOREIGN PATENT DOCUMENTS 158213  9/1983  Japan ........................ 156/83

Primary Examiner—Robert A. Dawson
Attorney, Agent, or Firm—C. H. Castleman, Jr.; H. W. Oberg, Jr.; J. L. Isaac

[57] ABSTRACT

A method of manufacturing a sensing element, comprising bringing a first body in the form of an oil-free cross-linked matrix of flexible elastomeric material, the matrix containing electrically conductive particles, into contact with a second body of flexible elastomeric material that is electrically insulating and that contains an oil compatible with the elastomeric material of the first body, and allowing oil to migrate from the second to the first body so as to cause swelling of the first body, the migration continuing until a state of oil phase equalisation between the two bodies is reached.

9 Claims, 1 Drawing Sheet

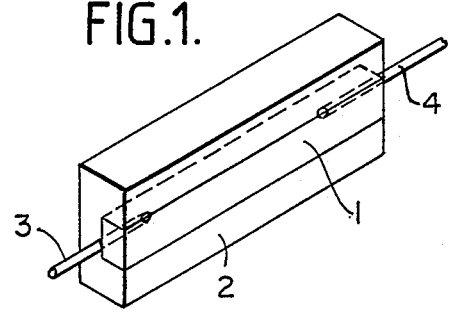
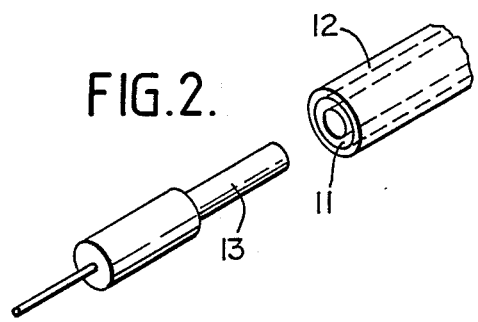
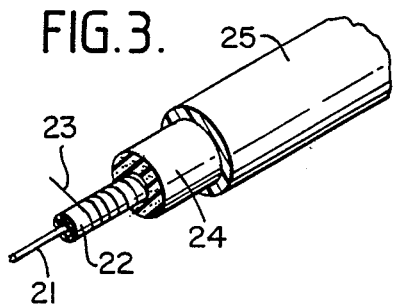
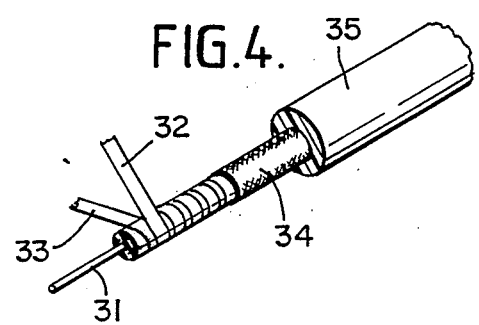

METHOD OF MANUFACTURING A SENSING ELEMENT

This invention relates to a method of manufacturing a sensing element.

Sensing elements are known that comprise a body of pressure sensitive electrically conductive material formed by a non-conductive matrix of flexible elastomeric material, the matrix containing electrically conductive particles. The resultant product is electrically non-conductive, but is rendered conductive when the material is deformed by application of a tensile or compressive load. By connecting such an element into an electrical resistance network it is possible to obtain an electrical signal that is related to the load applied to the sensor. It is also possible to use such an element as a load-responsive electrical switch.

Sensing elements based on so-called pressure conductive rubbers have been proposed in many different forms, and utilising many different materials. In one class of element the pressure conductive rubber itself is in contact with other elastomeric material that may form a substrate, a support, a jacket or an encapsulating body for the sensing element. In each case, the additional elastomeric material is generally selected so as to give the fabricated element the physical properties necessary for use in the particular environment for which the sensor is destined.

It has been found that certain pressure conductive rubbers only exhibit the required electrical characteristics if, after curing, the rubber is swollen by an oil that is compatible with the rubber. Thus, an extra swelling or oil-impregnation step is necessary in the fabrication of elements utilising such rubbers, and this places limitations on the fabrication techniques available. It has also been found that the electrical properties of certain pressure conductive rubbers tend to change with elapsed time if the pressure conductive rubber is in contact with another body of elastomeric material, and if both the rubber body and the pressure conductive rubber are compatible with an oil that is present in the fabricated element.

According to the present invention a method of manufacturing a sensing element comprises bringing a first body in the form of a substantially oil-free cross-linked matrix containing electrically conductive particles, into contact with a second body of flexible elastomeric material that is electrically insulating and that contains an oil compatible with the elastomeric material of the first body, and allowing oil to migrate from the second to the first body so as to cause swelling of the first body, the migration continuing until a state of oil phase equilibrium between the two bodies is reached.

The method of the invention thus utilises to advantage the migration effect that had hitherto been considered a problem, to introduce into the cross-linked matrix the oil necessary to give it the desired electrical properties. The migration of the oil and swelling of the matrix occurs after fabrication of the sensor, and thus does not require a separate process step in the manufacture of the sensor. Cost is thereby saved, and manufacturing techniques become available that hitherto could not be used.

Thus, in one advantageous embodiment of the invention the first and second bodies are coextruded into contact with each other. Such coextrusion techniques were not possible when the pressure conductive rubber had to undergo a separate oil impregnation step after cross-linking.

The first and second bodies may be of any shape that is appropriate to the final use to which the sensing element is to be put. Thus, the first body may be in the form of a strip, sheet or block, and the second body of a form that will give the required support to, or otherwise coact with, the body of pressure conductive rubber.

In one particular preferred form of the invention the first body is a tube, and the second body is a sheath surrounding, and in contact with the outer surface of the tube. The tube and the sheath are preferably coextruded, although it is possible to coat the tube by a separate extrusion step or by dipping the tube into the material that will then form the sheath.

In constructions of this nature the sensing element can be used in such a way that the electrical resistance of the element itself is measured. In another method of utilising pressure conductive rubber, the rubber is placed in contact with two electrical conductors and normally forms an insulating barrier between those two conductors. However, when pressure is applied to the rubber this becomes conductive, so completing a circuit between the conductors. The method of the invention is also useful in manufacturing sensing elements of this type, the conductors then being incorporated as required into the fabricated element.

In a particularly advantageous construction of an element of this type the first body is a hollow tube surrounding a continuous core of electrically conductive material, and further electrically conductive material is located at the interface between the tube and a sheath surrounding the tube, the further material being electrically continuous along the full length of the body yet having openings to allow contact between the tube and the sheath.

After fabrication, the first body obtains the required electrical properties by oil migrating from the second body through the openings in the further electrically conductive material. Once oil phase equilibrium has been reached, the sensor is ready for use, with the first body forming a normally insulating barrier between the continuous core and the further conductive material. However, when a compressive force is applied to any part of the element the resistance of the first body in the compressed area is significantly reduced, so allowing current to flow between the continuous core and the further conductive material to give a switching effect.

The further electrically conductive material may, for example, be a conductive wire that is helically wound around the first body, or may be a braided cover formed around the first body. In either event it will be seen that the sensor can be fabricated on a continuous production line, the first body being extruded around the continuous core, being subsequently provided with a further electrically conductive material and the second body then being extruded over that further conductive material. The resultant element is cheap and robust and can exhibit excellent flexibility. It can find use as a sensing cable in place of present cables utilising piezo-electric ceramics as a barrier between conductors, which earlier cables are expensive and are prone to mechanical fatigue.

In a further embodiment of the method of the invention the first and second bodies may be wound together in contiguous helical form around a continuous core. The core may again be of electrically conductive material, and the outer surface of the helically wound mass may then be surrounded by further electrically conductive material that is electrically continuous along the full length of the body. In this construction the oil can migrate directly between the two bodies and does not need to pass through any barrier that may be formed by the further electrically conductive material.

Preferably the matrix material is oil-free silicone rubber, and the second body is a body of silicone rubber that is loaded with silicon oil. However, other matrix materials can be used, such as natural rubber, styrene butadiene rubber, nitrile-butadiene, sythetic polyisoprene rubber and ethylene-propylene-non-conjugated diene rubbers, the second body being a body of any suitable rubber (including the rubbers from which the matrix may be formed) loaded with an oil capable of migrating between the second body and the matrix, such as a naphthenic or paraffinic oil.

Other non-conductive materials such as solvents, plasticising agents, stabilizers, pigments and colouring agents may be incorporated into the matrix composition. Such composition may contain fillers such as silica, silicates, kaolin, mica, talc, carbonates or alumina. Generally speaking, the matrix material should be compounded so that it can resist a high-intensity electric field, has good electrically insulating properties and the mechanical properties appropriate to the end use. In some cases these properties include low permanent set and high elongation at break.

The electrically conductive (which term is used herein to include semi-conductive) particles that are present in the matrix material of the first body may be of any suitable conductive material, or a blend of any such materials. Merely by way of example, the conductive material may be selected from carbon (for example as carbon black), graphite (for example fine ground artificial graphite), silicone (for example undoped, chemical grade silicone powder), silver, tellurium and molybdenum disulphide.

The invention also extends to sensing elements when made by any of the aforesaid methods.

In order that the invention may be better understood specific examples thereof will now be described in more detail, by way of example only, with reference to the accompanying drawings in which:

FIGS. 1 to 4 are each a schematic representation of a different sensing element manufactured by a method according to the invention.

FIG. 1 shows a simple fabricated sensor comprising a first body 1 of pressure conductive rubber supported on a substrate 2 of electrically insulating flexible elastomeric material. A suitable composition for the pressure conductive rubber body 1 is a carbon-filled high temperature vulcanising silicone rubber such as VPR 3176 obtainable from Wacker-Chemie GmbH. To fabricate the sensor, the body 1 is moulded and cross-linked. The crosslinked body 1 is then supported in a further mould, and the flexible elastomeric material for forming the substrate 2 is poured into the mould and allowed to cure around the body 1. A suitable formulation for the substrate 2 is 100 parts by weight of an addition-cured room temperature vulcanising silicone rubber such as Silastic E from Dow Chemical Company, blended with 20 parts by weight of silicon fluid such as F111/50 from Ambersil.

It will be noted that electrical connectors 3, 4 are connected to opposite ends of the pressure conductive rubber body 1, and that the connection points are encapsulated in the material of the substrate 2. After the substrate material has cured the composite element is removed from the mould and is allowed to age at room temperature. During the aging process the silicone oil from the substrate material migrates into the silicone rubber of the body 1, and during this process the desired electrical characteristics of the body 1 are developed. Once a state of oil phase equilibrium has been reached between the two bodies the sensing element is ready for use.

The connectors 3, 4 may be connected into an electrical resistance circuit, and the resistance of the body 1 will change in accordance with force applied either to elongate or compress the sensing element.

Referring to FIG. 2, this shows another form of sensing element comprising an inner tube 11 of pressure conductive rubber, the outer surface of which is surrounded by a sheath 12 of electrically insulating flexible elastomeric material.

The material of the tube 11 may conveniently be a high temperature vulcanising silicone rubber, and again Wacker-Chemie GmbH VPR 3176 has been found suitable A suitable composition for the sheath 12 is the aforesaid blend of Silastic E and F111/50.

The sensor may be manufactured by a coextrusion process, or the sheath 12 may be extruded onto the preformed tube 11 in a separate extrusion process, or may be formed by dipping the pre-formed tube 11 into the sheath material 12 while this is in liquid form. After fabrication, silicone oil will migrate from the sheath into the tube 11 in order to swell the tube and to develop the required electrical properties for that tube. The tube may be connected as a resistance element into an electrical circuit by inserting conductive probes such as 13 into opposite open ends of the tube, as described in our copending application of even date herewith.

FIG. 3 shows a further embodiment of sensing element comprising a continuous copper wire core 21 surrounded by a body 22 of pressure conductive rubber. A continuous length of copper wire 23 is helically wound around the outer surface of the conductive rubber tube 22. A second body 24 of electrically insulating elastomeric material is formed around the wire 23, and finally a wear resistant protective jacket 25 is formed around the body 24. The first body 22 of pressure conductive rubber is initially oil-free, whereas the second body 24 of electrically insulating material is oil-bearing.

The sensing element shown in FIG. 3 is formed by extruding the pressure conductive rubber 22 onto the central copper conductor 21, winding the copper wire 23 around the extruded body 22, extruding the body of one conductive rubber 24 onto the wound composite, and then extruding the outer jacket 25 onto the body 24. The process may thus be carried out on a continuous production line. After manufacture, the element is allowed to age, whereupon oil from the material 24 migrates through the openings between adjacent turns of the copper wire 23 into the matrix elastomer of the body 22.

FIG. 4 shows yet another embodiment of sensing element. In this case a central copper conductor 31 is surrounded by a cover that is formed from alternating helical turns of oil-free cross-linked elastomer 32 containing electrically conductive particles, and of oil bearing electrically insulating elastomer 33. A second electrical conductor 34 is then formed by braiding copper wire around the cover 32, 33, the braiding being protected by a wear resistant outer jacket 35. Again, the sensor may be formed on a production line process, either with elastomers 32, 33 being co-extruded onto conductor 31, or preformed strips being wound around the conductor 31 to form the cover 32, 33, the resulting composite then being passed through a braiding machine and finally through an extruder which extrudes the jacket material 25. After fabrication, oil migrates from the oil bearing elastomer 33 into the elastomeric matrix of the body 32 in order to develop the required electrical properties.

It will be appreciated that many other types of sensing element may be manufactured by methods according to the invention.

We claim:

1. A method of manufacturing a sensing element, comprising bringing a first body in the form of an oil-free cross-linked matrix of flexible elastomeric material, the matrix containing electrically conductive particles, into contact with a second body of flexible elastomeric material that is electrically insulating and that contains an oil compatible with the elastomeric material of the first body, and allowing oil to migrate from the second to the first body so as to cause swelling of the first body, the migration continuing until a state of oil phase equalisation between the two bodies is reached.

2. A method according to claim 1 in which the first and second bodies are co-extruded into contact with each other.

3. A method according to claim 1 in which the first body is a tube and the second body is a sheath surrounding, and in contact with, the outer surface of the tube.

4. A method according to Claim 3 in which the first body surrounds a continuous core of electrically conductive material, and further electrically conductive material is located at the interface between the core and the sheath, the further material being electrically continuous along the full length of the body yet having openings to allow contact between the tube and the sheath.

5. A method according to claim 4 in which the first body is a tube and the second body is a sheath surrounding, and in contact with, the outer surface of the tube.

6. A method according to claim 1 in which the first and second bodies are wound together in continuous helical form around a continuous core.

7. A method according to claim 5 in which the core is of electrically conductive material, and the outer surface of the helically wound mass is surrounded by further electrically conductive material that is electrically continuous along the full length of the body.

8. A method according to claim 7 in which the further electrically conductive material is wholly surrounded by a jacket of wear-resistant, electrically insulating material.

9. A method according to claim 1 in which the matrix material is oil-free silicone rubber and in which the second body is a body of silicone rubber that is loaded with silicon oil.

* * * * *